(12) United States Patent
Russell

(10) Patent No.: US 6,505,121 B1
(45) Date of Patent: Jan. 7, 2003

(54) ONBOARD VEHICLE NAVIGATION SYSTEM

(75) Inventor: Paul Grady Russell, Campbell, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/918,470

(22) Filed: Aug. 1, 2001

(51) Int. Cl.[7] .............................................. G01C 21/00
(52) U.S. Cl. ..................... 701/213; 701/200; 78/178 R; 340/588
(58) Field of Search ................................ 701/213, 200, 701/208, 211; 73/178 R; 340/988, 990, 989, 995

(56) References Cited

U.S. PATENT DOCUMENTS

| | | | | |
|---|---|---|---|---|
| 5,528,248 A | * | 6/1996 | Steiner et al. ......... | 342/357.06 |
| 5,796,394 A | * | 8/1998 | Wicks et al. ................. | 345/751 |
| 5,918,157 A | * | 6/1999 | Wiedeman et al. .......... | 370/316 |
| 6,058,307 A | * | 5/2000 | Garner ....................... | 455/12.1 |
| 6,233,506 B1 | * | 5/2001 | Obradovich et al. ........ | 307/10.2 |
| 6,243,580 B1 | * | 6/2001 | Garner ....................... | 455/12.1 |
| 6,252,544 B1 | * | 6/2001 | Hoffberg ............... | 342/357.06 |
| 6,266,612 B1 | * | 7/2001 | Dussell et al. .......... | 342/357.17 |
| 6,320,496 B1 | * | 11/2001 | Sokoler et al. ........... | 340/407.1 |
| 6,374,177 B1 | * | 4/2002 | Lee et al. .................... | 340/988 |
| 6,377,793 B1 | * | 4/2002 | Jenkins ........................ | 455/412 |

* cited by examiner

Primary Examiner—William A. Cuchlinski, Jr.
Assistant Examiner—Olga Hernandez

(57) ABSTRACT

An automotive docking station includes user interface keys, an interface to a GPS receiver, an interface to a hand held processor, and a power interface to a vehicle. A method of using a docking station includes reading a current location from a GPS receiver integrated onto the docking station, and sending the current location to a hand held processor integrated onto the docking station to display a local map.

6 Claims, 4 Drawing Sheets

ONBOARD VEHICLE NAVIGATION SYSTEM

BACKGROUND OF THE INVENTION

1. Field of the Invention

The present invention relates to onboard automobile navigation solutions. In particular, the invention relates to a docking station to integrate a GPS receiver and a hand held computer on the docking station to implement an automobile navigation system.

2. Description of Related Art

Known built in automobile navigation systems are very expensive and difficult to install. On the other hand, although hand held processors (commonly referred to as personal data assistants such as a Palm Pilot™) are currently integrated with cellular telephones for some purposes, such hand held processor are not integrated into automobile navigation systems with a GPS receiver. Hand held GPS receivers are known, but they do not integrate with user input navigation keys or a cellular telephone remote unit. The hand held GPS receiver system forces users to either use the receiver loose in their car or build their own mounting box or docking station. The loss of attention from the road by a driver looking to view a GPS receiver that is loose on a passenger seat, possibly fallen on to the floor, can be dangerous. Currently, if any of these components are connected together at all, they are connected in a jumble of loose wires subject to sliding and moving as the vehicle breaks, accelerates and corners. On the other hand, if the technology were built into the automobile's dashboard, upgrades in these rapidly evolving technologies would require expensive modification or mechanical work on the dashboard.

SUMMARY OF THE INVENTION

In the present invention, existing component technologies (e.g., hand held processor and GPS receiver that a user might already own, are combined in a docking station into a navigation system. The navigation system might also advantageously include a cellular telephone to provide internet access. The docking station includes integrated user input buttons to request diverse types of navigation information. The docking station preferably includes a speaker by which the navigation system can give audible direction commands. The docking station integrates the existing component technologies over wired links, infrared links or RF links. All of the components are mounted directly to the dashboard, or indirectly through the docking station to the dashboard, using molded plastic clips. Non aggressive mounting, that snaps onto the automobile's interior molding, using no adhesives or screws or bolts and nuts avoids damaging the automobile's interior.

It is an object to the present invention to overcome limitations in the prior art. It is a further object of the present invention to combine known component technologies into an automobile navigation system.

These and other objects are achieved in an automotive docking station that includes user interface keys, an interface to a GPS receiver, an interface to a hand held processor, and a power interface to a vehicle.

These and other objects are alternatively achieved in a method of using a docking station that includes reading a current location from a GPS receiver integrated onto the docking station, and sending the current location to a hand held processor integrated onto the docking station to display a local map.

BRIEF DESCRIPTION OF DRAWINGS

The invention will be described in detail in the following description of preferred embodiments with-reference to the following figures wherein.

DETAILED DESCRIPTION OF PREFERRED EMBODIMENTS

Figure 1:
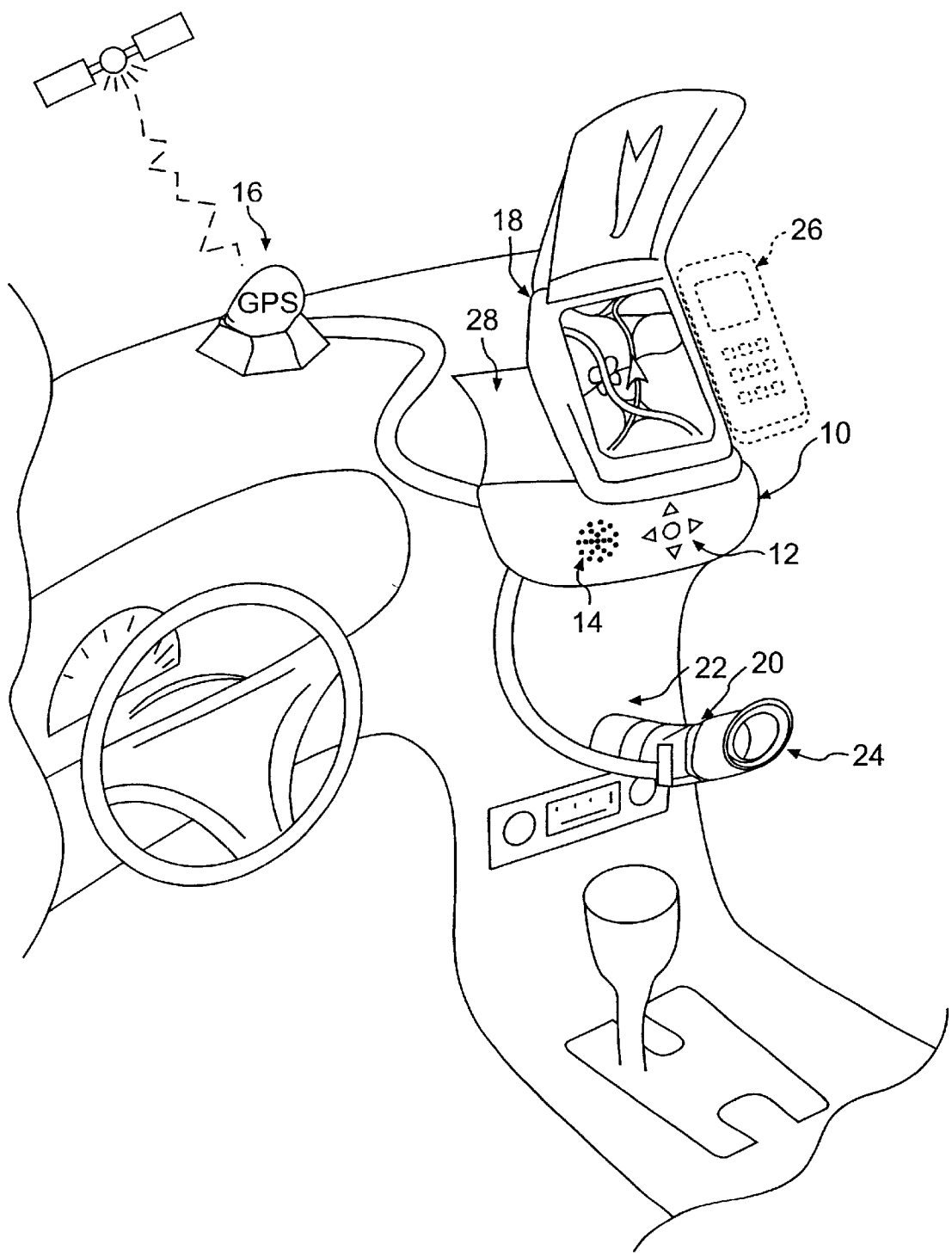
FIG. 1 is a schematic of the docking station of the present invention installed in an automotive application.
Figure 2:
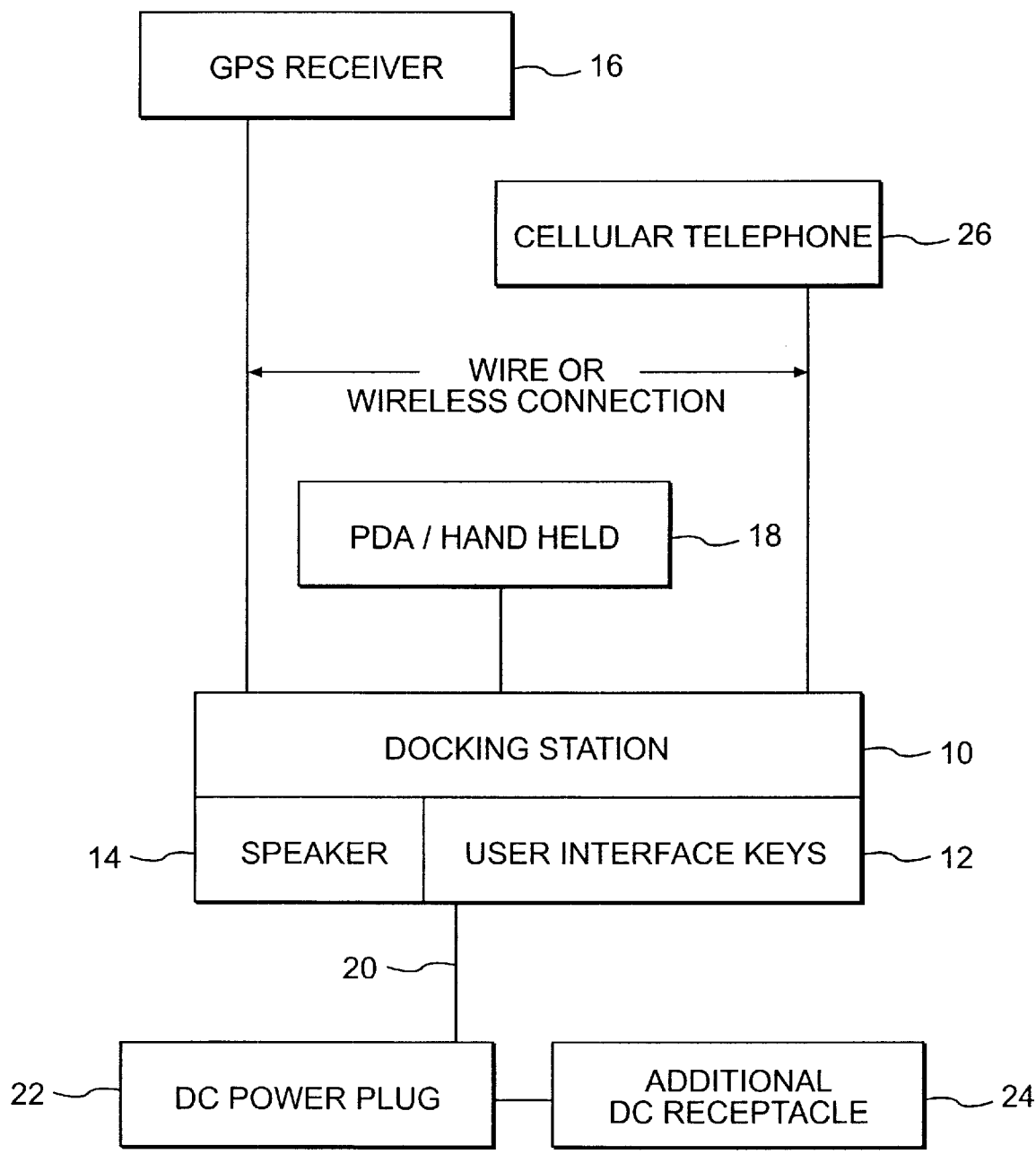
FIG. 2 is a block diagram of the docking station showing interfaces to a personal data assistant (PDA), a GPS receiver and a cellular telephone.

The present invention integrates a GPS receiver and a hand held computer on a docking station to implement an automobile navigation system. In FIGS. 1 and 2, docking station 10 includes built in user interface keys 12, built in speaker 14, an interface to GPS receiver 16, an interface to hand held processor 18 (e.g., the class of device commonly called personal data assistant, such as a Palm Pilot™), and power interface 20 to a vehicle. The docking station may advantageously include an interface to remote cellular telephone unit 26, and vehicle mounting interface 28 to mount docking station 10 to the vehicle. Vehicle mounting interface 28 is preferably a non-aggressive vehicle mounting attachment such as a molded plastic clip (e.g., ProClip™ by E. Global, Inc.) that snaps onto the vehicle's interior molding without a need for adhesives or mechanical screws or bolts and nuts, but docking station 10 is attached to vehicle mounting interface 28 with adhesives or mechanical means (e.g., screws or bolts and nuts). Power interface 20 preferably includes plug 22 at one end to plug power interface 20 into the vehicle power source (e.g., a 12 volt DC cigarette lighter outlet) and socket 24 to receive a power plug from additional vehicle electrical devices that can use the vehicle power source.

The interface to a GPS receiver in docking station 10 may be advantageously coupled to GPS receiver 16 over a first infrared link or RF link. The interface to a hand held processor in docking station 10 may be advantageously coupled to hand held processor 18 over a second infrared link or RF link. The interface to a remote cellular telephone unit in docking station 10 may be advantageously coupled to remote cellular telephone unit 26 over a third infrared link or RF link.

The interface to a GPS receiver in docking station 10 may advantageously include a first molded plastic clip to mechanically hold GPS receiver 16. The interface to a hand held processor in docking station 10 may advantageously include a second molded plastic clip to mechanically hold hand held processor 18. The interface to a remote cellular telephone unit in docking station 10 may advantageously include a third molded plastic clip to mechanically hold remote cellular telephone unit 26.

Docking station 10 advantageously includes a microprocessor, a memory, and software modules stored in the memory to control docking station 10. A first module includes processor instructions to translate a current location in a first format received at the interface to a GPS receiver into a second format and to send the current location in the second format to the interface to a hand held processor. Hand held device 18 includes software in itself to generate a map display on the display of hand held device 18 based on the current location. A second module includes processor instructions to receive user commands from user interface keys 14 to send the desired location to the interface to a hand held processor, whereupon hand held processor, using its own software, displays the a user identified desired location by a cursor on the display. A third module includes processor instructions to receive map information, preferably in the form of roads encoded by software in the hand held processor, from the interface to a hand held processor based on the current location. A fourth module includes processor instructions to control the speaker to produce an audible direction command (e.g., "turn left in two miles") based on the current location, the map information and the desired location.

In addition, a software module may advantageously be incorporated to access the internet through remote cellular telephone unit 26 so that the most recent traffic information might be made available to the microprocessor of docking station 10. The docking station 10 might then give voice navigation commands to avoid traffic jams.

In addition, a software module may advantageously be incorporated to access the internet through remote cellular telephone unit 26 to access e-mail in text form, and use text to audio translation software in the hand held processor to read the e-mail through speaker 14 in an audible format.

The use of powerful hand held processors with their software, in particular, their text to voice software, enables the present invention, with its built in speaker, to be particularly useful in a hands free automobile environment to assist a solo driver.

Figure 3:
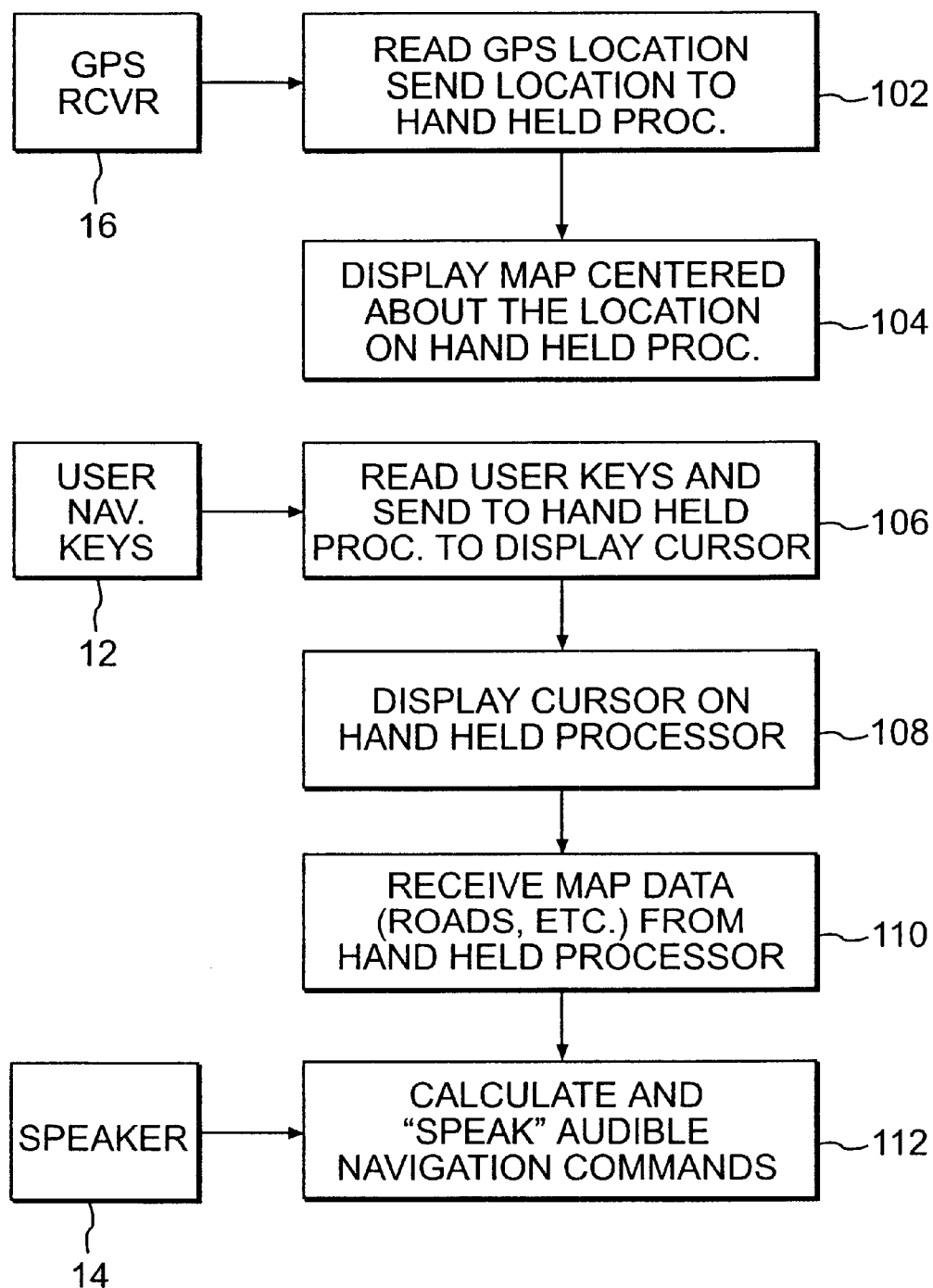
FIG. 3 is a flow chart of a navigation method according to the present invention.

In an alternative embodiment depicted in FIG. 3, the docking station described above includes a microprocessor, a memory and software modules to control the microprocessor. At 102, a module reads the current location from GPS receiver 16 and sends the current location through an interface to hand held processor 18. At 104, hand held processor 18, with its own mapping software, displays a local map centered about the current location. At 106, a module reads user navigation keys 12 to determine a desired location, offset from the current location and sends the desired location to the interface to hand held processor 18. At 108, hand held processor 18, with its own software, displays a cursor at the desired location so that the driver or navigator can obtain visual feedback. The driver or navigator continues to move the cursor to the desired location. At 110, a module receives map data, such as road locations, etc., from the interface to hand held processor 18, and at 112, a module calculates a navigation command in text, sends the text to the hand held processor to convert to speech data, receives the speech data and plays the speech data (i.e., audible command) through speaker 14 of docking station 10.

Figure 4:
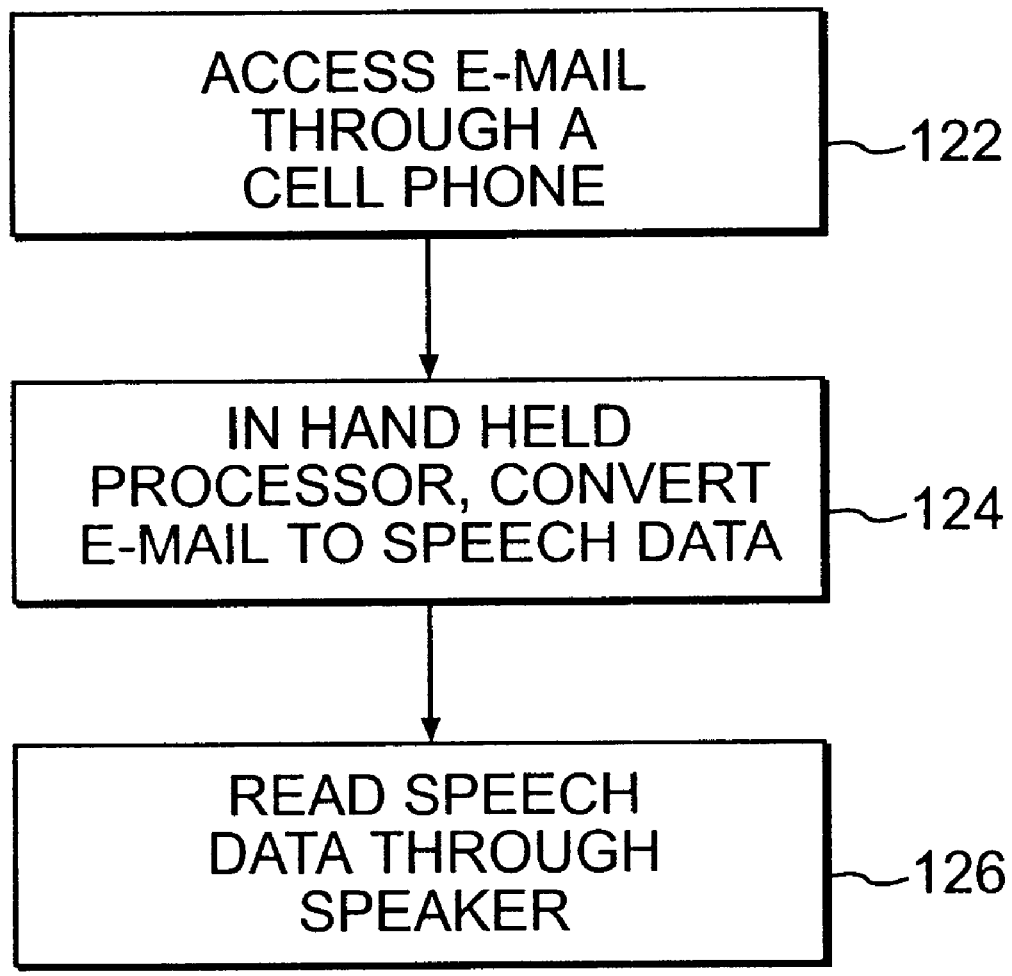
FIG. 4 is a flow chart of a e-mail reading method according to the present invention.

In an alternative embodiment depicted in FIG. 4, the docking station described above includes a microprocessor, a memory and software modules to control the microprocessor. At 122, a module accesses e-mail through the interface to a remote cellular telephone, and from there through a wireless connection to the internet. At 124, a module sends the e-mail (in text format) through the interface to a hand held processor to be converted into speech data using software of the hand held processor. At 126, a module reads the speech data from the hand held processor and plays the that in audible form through speaker 14 of docking station 10.

Having described preferred embodiments of a novel onboard vehicle navigation system (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by letters patent is set forth in the appended claims:

What is claimed is:

1. A docking station comprising:

a microprocessor;

a memory;

software modules stored in the memory to control the docking station;

a speaker; and an interface to a remote cellular telephone unit, wherein the software modules include:
 a module to translate a current location in a first format received at an interface to a GPS receiver into a second format and to send the current location in the second format to an interface to a hand held processor;
 a module to receive user commands from user interface keys to designate a desired location and to send the desired location to the interface to the hand held processor;
 a module to receive map information from the interface to the hand held processor based on the current location;
 a module to control the speaker to produce an audible direction command based on the current location, the map information and the desired location;
 a module to control the interface to a remote cellular telephone unit to access traffic information on the internet;
 a module to control the interface to the hand held processor to convert the traffic information into a message in a speech format; and
 a module to play the message in the speech format through the speaker.

2. A docking station comprising:

a microprocessor;

a memory;

a speaker;

an interface to a remote cellular telephone unit; and software modules stored in the memory to control the docking station, wherein the software modules include:
 a module to control the interface to the remote cellular telephone unit to access an e-mail message from an internet connection,
 a module to control an interface to a hand held processor to convert the email message into a message in a speech format, and
 a module to play the message in the speech format through the speaker.

3. A docking station comprising:

a microprocessor;

a memory;

a speaker;

an interface to a remote cellular telephone unit; and software modules stored in the memory to control the docking station, wherein the software modules include:
 a module to control the microprocessor to access e-mail through the interface to a remote cellular telephone unit,
 a module to control the microprocessor to send the e-mail through the interface to a hand held processor for conversion to speech data, a module to control the microprocessor to receive the speech data from the interface to a hand held processor, and a module to control the microprocessor to play the speech data in audible form though the speaker.

4. The docking station of claim 1, further comprising a vehicle mounting interface to mount the docking station to the vehicle.

5. The docking station of claim 3, wherein the software modules further include a module to translate a current location in a first format received at an interface to a GPS receiver into a second format and to send the current location in the second format to the interface to the hand held processor.

6. The docking station of claim 5, further comprising a speaker, wherein the software modules further include:

a module to receive user commands from user interface keys to designate a desired location and to send the desired location to the interface to the hand held processor;

a module to receive map information from the interface to the hand held processor based on the current location; and a module to control the speaker to produce an audible direction command based on the current location, the map information and the desired location.

* * * * *